(12) United States Patent
Destefanis et al.

(10) Patent No.: US 11,418,590 B2
(45) Date of Patent: Aug. 16, 2022

(54) FAST PROPAGATION OF RECENT TRANSACTIONS OVER A BLOCKCHAIN NETWORK

(71) Applicant: nChain Licensing AG, Zug (CH)

(72) Inventors: Giuseppe Destefanis, London (GB); Patrick Motylinski, London (GB); Stephane Vincent, Luxembourg (LU); Craig Steven Wright, London (GB)

(73) Assignee: nChain Licensing AG, Zug (CH)

( * ) Notice: Subject to any disclaimer, the term of this patent is extended or adjusted under 35 U.S.C. 154(b) by 259 days.

(21) Appl. No.: 16/625,641

(22) PCT Filed: Jun. 19, 2018

(86) PCT No.: PCT/IB2018/054501
§ 371 (c)(1),
(2) Date: Dec. 20, 2019

(87) PCT Pub. No.: WO2018/234987
PCT Pub. Date: Dec. 27, 2018

(65) Prior Publication Data
US 2020/0162550 A1   May 21, 2020

(30) Foreign Application Priority Data
Jun. 20, 2017 (GB) .................................. 1709848

(51) Int. Cl.
*H04L 9/40* (2022.01)
*H04L 67/1097* (2022.01)
(Continued)

(52) U.S. Cl.
CPC ........ *H04L 67/1097* (2013.01); *H04L 9/0637* (2013.01); *H04L 9/0643* (2013.01);
(Continued)

(58) Field of Classification Search
CPC ... H04L 9/0637; H04L 9/0643; H04L 9/3236; H04L 63/123; H04L 63/0428;
(Continued)

(56) References Cited

U.S. PATENT DOCUMENTS

| 10,050,779 B2 | 8/2018 | Alness et al. |
| 2004/0064693 A1 | 4/2004 | Pabla et al. |

(Continued)

FOREIGN PATENT DOCUMENTS

| CN | 103729461 A | 4/2014 |

OTHER PUBLICATIONS

Antonopoulos, "Mastering Bitcoin—Unlocking Digital Cryptocurrencies," O'Reilly Media, Inc., Dec. 20, 2014, 282 pages.
(Continued)

*Primary Examiner* — Le H Luu
(74) *Attorney, Agent, or Firm* — Davis Wright Tremaine LLP

(57) ABSTRACT

A specialized network ("merchant") node to facilitate fast distribution of blockchain transactions over a network of interconnected nodes, as subset of which are merchant nodes interconnected by an overlay network. The merchant node includes a memory storing an assigned portion of a distributed mempool structured as a distributed hash table, the distributed mempool containing pending transactions awaiting confirmation. The merchant node operates by receiving a transaction, including a transaction identifier; hashing the new transaction identifier to obtain a key; determining, using the key, whether the transaction is stored in the distributed mempool or not and, if not, then storing the transaction in the distributed mempool as a pending transaction; and sending the transaction to a set of nodes other than merchant
(Continued)

nodes using peer-to-peer connections. The invention may be used in conjunction with the Bitcoin blockchain or an alternative.

16 Claims, 5 Drawing Sheets

(51) Int. Cl.
  *H04L 9/06* (2006.01)
  *H04L 67/12* (2022.01)
  *H04L 67/1095* (2022.01)
  *H04L 67/1087* (2022.01)
  *H04L 67/1061* (2022.01)

(52) U.S. Cl.
  CPC ...... *H04L 67/1065* (2013.01); *H04L 67/1093* (2013.01); *H04L 67/1095* (2013.01); *H04L 67/12* (2013.01); *H04L 2209/38* (2013.01)

(58) Field of Classification Search
  CPC ............. H04L 67/1065; H04L 67/1093; H04L 67/1095; H04L 67/1097; H04L 67/12; H04L 2209/38; H04L 9/14; H04L 9/3247; G06F 16/1805; G06F 16/2379; G06Q 20/065; G06Q 20/10; G06Q 20/3827; G06Q 20/401
  See application file for complete search history.

(56) References Cited

U.S. PATENT DOCUMENTS

| | | | |
|---|---|---|---|
| 2009/0122724 A1 | 5/2009 | Rosenberg | |
| 2015/0269541 A1 | 9/2015 | MacGregor et al. | |
| 2016/0292672 A1* | 10/2016 | Fay | G06Q 20/3827 |
| 2016/0300222 A1* | 10/2016 | Yang | G06Q 20/065 |
| 2017/0046698 A1* | 2/2017 | Haldenby | G06Q 20/065 |
| 2017/0116693 A1 | 4/2017 | Rae et al. | |
| 2017/0236123 A1 | 8/2017 | Ali et al. | |
| 2017/0295023 A1* | 10/2017 | Madhavan | H04L 9/3247 |
| 2018/0103042 A1* | 4/2018 | Castagna | H04L 63/0428 |
| 2018/0137506 A1* | 5/2018 | Kel | G06Q 20/401 |
| 2018/0139278 A1* | 5/2018 | Bathen | H04L 9/3236 |
| 2018/0268418 A1* | 9/2018 | Tanksali | G06Q 20/401 |
| 2018/0285879 A1* | 10/2018 | Gadnis | G06F 16/1805 |
| 2018/0349877 A9* | 12/2018 | Maim | H04L 9/14 |
| 2019/0005470 A1* | 1/2019 | Uhr | G06F 16/2379 |
| 2019/0327218 A1* | 10/2019 | Altenhofen | G06Q 20/10 |

OTHER PUBLICATIONS

Deathandtaxes, "Using a DHT to Reduce the Resource Requirements of Full Nodes," retrieved from https://bitcointalk.org/index.php?topic=662734.0, Jun. 23, 2014, 11 pages.
Greatwolf, "What Happens if Everyone Prunes Blocks?" retrieved from https://www.reddit.com/r/Bitcoin/comments/3det7n/what_happens_if_everyone_prunes_bloc ks/, Jul. 15, 2015, 7 pages.
Gronager, "[Bitcoin\-development\] Blocking Uneconomical UTXO Creation," retrieved from https://www.mail-archive.com/search?l=bitcoin-development@lists.sourceforge.net&q=subject:%22\[Bitcoin\-development\]+Blocking+uneconomical+UTXO+creation%22&o=newest&f=1, Mar. 13, 2013, 21 pages.
International Search Report and Written Opinion dated Oct. 1, 2018, Patent Application No. PCT/IB2018/054501, 11 pages.
IRC, "Chat Logs from Bitcoin-Wizard IRC Channel," retrieved from https://download.wpsoftware.net/bitcoin/wizards/2015-05-10.html, Oct. 5, 2015, 7 pages.
Jgarzik, "Chat Logs from Bitcoin Wizard IRC Channel," retrieved from https://download.wpsoftware.net/bitcoin/wizards/2014-08-06.html. Aug. 6, 2014, 15 pages.
Killerstorm, "I Tried to Hack BitCoin and Failed—Dan Kaminsky," retrieved from https://www.reddit.com/r/Bitcoin/comments/1c7lzi/i_tried_to_hack_bitcoin_and_failed_dan_kaminsky/, Apr. 12, 2013, 29 pages.
Liu et al., "Speedy: A Sybil-Resistant DHT Implementation," retrieved from https://courses.csail.mit.edu/6.857/2014/files/25-liu-long-thaker-zheng-speedy-dht.pdf, Mar. 15, 2014, 13 pages.
Maxwell et al., "Chat Log Sep. 12-13, 2013," Bitcoin Wizards IRC Channel, https://download.wpsoftware.net/bitcoin/wizards/2013/09/13-09-12.log, Sep. 12, 2013, 8 pages.
Mohaisen et al., "Keep your Friends Close: Incorporating Trust into Social Network-Based Sybil Defenses," retrieved from https://www-users.cs.umn.edu/~hopper/sybil-infocom.pdf, 2011, 9 pages.
Nakamoto, "Bitcoin: A Peer-to-Peer Electronic Cash System," Bitcoin, Oct. 31, 2008, https://bitcoin.org/bitcoin.pdf, 9 pages.
Norberg et al., "Storing Arbitrary Data in the DHT," retrieved from http://bittorrent.org/beps/bep_0044.html, Dec. 19, 2014, 8 pages.
Poon et al., "The Bitcoin Lightning Network: Scalable Off-Chain Instant Payments," https://www.bitcoinlightning.com/wp-content/uploads/2018/03/lightning-network-paper.pdf, Jan. 14, 2016 [retrieved Dec. 10, 2018], 59 pages.
Satoshi et al., "Connection Limits," Bitcoin Forum, Aug. 9, 2010, https://bitcointalk.org/index.php?topic=741.0; prev_next=prev, 2 pages.
Sidhujag, "IRC Logs for #IPFS," retrieved from https://botbot.me/freenode/ipfs/2017-03-15/?page=6, Mar. 15, 2017, 13 pages.
Todd, "[ANN][XCP] Counterparty—Pioneering Peer-to-Peer Finance—Official Thread," retrieved from https://bitcointalk.org/index.php?topic=395761.msg5970778;topicseen, Mar. 29, 2014, 9 pages.
Tschorsch et al., "Bitcoin and beyond: A technical survey on decentralized digital currencies," IEEE Communications Surveys and Tutorials 18(3):2084-123, Mar. 2, 2016.
UK Commercial Search Report dated Oct. 25, 2017, Patent Application No. GB1709848.4, 10 pages.
UK IPO Search Report dated Dec. 11, 2017, Patent Application No. GB1709848.4, 4 pages.

* cited by examiner

FAST PROPAGATION OF RECENT TRANSACTIONS OVER A BLOCKCHAIN NETWORK

This invention relates generally to distributed ledger (blockchain) networks. In particular, it may relate to cryptographically enforced methods and systems for improving the performance of a blockchain network, and/or increasing the speed at which transfers can be performed over the network.

In this document we use the term 'blockchain' to include all forms of electronic, computer-based, distributed ledgers. These include, but are not limited to consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention.

A blockchain is a consensus-based, electronic ledger which is implemented as a computer-based decentralised, distributed system made up of blocks which in turn are made up of transactions. Each transaction (Tx) is a data structure that encodes the transfer of control of a digital asset between participants in the blockchain system, and includes at least one input and at least one output. Each block contains a hash of the previous block so that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

Network nodes that receive a new transaction will quickly try to push that transaction out to other nodes in the network. Before transmitting a new transaction to other nodes, it is "validated", meaning it is checked against a set of criteria to ensure the transaction meets the basic requirements for a proper transaction according to the applicable blockchain protocol.

In order for a transaction to be written to the blockchain, it is incorporated into a block by a node (a "miner") that is designed to collect transactions and form them into blocks. The miner then attempts to complete a "proof of work" with respect to the node. Miners throughout the blockchain network compete to be the first to assemble a block of transactions and complete the associated proof of work for that block. The successful miner adds its confirmed block to the blockchain and the block is propagated through the network so that other nodes that maintain a copy of the blockchain can update their records. Those nodes receiving a block also "validate" that block and all the transactions in it to ensure it complies with the formal requirements of the protocol.

One of the bottlenecks associated with blockchain implementation is the delay associated with waiting for a miner to complete the proof of work that confirms a block of transactions and results in adding that block of transactions to the blockchain. Using the Bitcoin system as an example, the system, by design, takes about 10 minutes for a block to be confirmed and added to the blockchain. Meanwhile, unconfirmed transactions accumulate in a memory pool (herein referred to as a "mempool"), an approximately complete copy of which is maintained at each node in the network. Analysis of the Bitcoin architecture shows that, with its 10-minute block confirmation throughput, the system can handle transaction throughput of about 3 new unconfirmed transactions per second, based on the size of typical transactions and blocks, and the speed with which those accumulated unconfirmed transactions can be incorporated into new blocks.

It would be advantageous to enable or facilitate the use of widespread, cryptographically-secured exchanges using a blockchain-based network like Bitcoin. Such an exchange could relate to, for example, payment processing such as for credit card transactions. However, the transaction throughput of about 3 per second is insufficient for handling such electronic payments, which currently operate at a transactional volume of about 50,000 per second. Accordingly, it would be desirable to find a solution to the speed and scalability constraints that currently limit blockchain's ability to process high-volume transactions.

Such a solution has now been devised.

Thus, in accordance with the present invention there are provided methods and devices as defined in the appended claims.

The present application describes and discloses methods and devices that enable fast propagation of blockchain transactions (TXs) through a network of dedicated merchant nodes designed to implement a blockchain for fast/improved speed of transaction processing. The term "transaction" may be interpreted as meaning "blockchain transaction ie. a Tx) rather than a transaction in the financial sense. To minimize network traffic and alleviate storage capacity limitations, the memory pool ("mempool") of pending transactions awaiting incorporation into a block may be stored among the specialised (merchant) nodes in as a distributed mempool implemented by way of a distributed hash table (DHT). A new transaction received by a merchant node may have its identifier hashed, and the merchant node may assess whether it is stored in the distributed mempool already. If not, then it may be stored it in the distributed mempool at the appropriate one or more merchant nodes using the applicable DHT protocol. The merchant node may then send the transaction Tx to ordinary non-merchant nodes using conventional peer-to-peer connections; however, it need not send the transaction to all the other merchant nodes.

In an additional or alternative aspect, the present application describes a specialised network node to facilitate (fast) distribution of blockchain transactions over a network of interconnected nodes used to implement a blockchain, a subset of which are specialised network nodes interconnected by an overlay network. Hereafter, the term "specialised network node" may be used interchangeably with the terms "SN" or "merchant node" for the sake of convenience only.

In some implementations, the use of an overlay network of specialised network nodes for implementing and managing the mempool in the form of a DHT may provide computing speed and propagation speed advantages over implementation of a mempool at all network nodes. Moreover, the use of specialised network nodes in an overlay network to the regular network of blockchain nodes avoids the complexity and likely speed and reliability complications of implementing a DHT mempool across the full network of blockchain nodes with each node storing and maintaining a very small portion of the DHT. This structure may permit the non-specialised nodes to quickly query the mempool through one of the specialised nodes. It may further be advantageous that the specialised network node initiate propagation to non-specialised nodes outside the overlay network using peer-to-peer communications after updating the DHT to ensure nodes outside the overlay network, such as mining nodes, are able to maintain a partial or complete mempool if desired. Other speed and storage advantages may be realized through various aspects of the present application as will be apparent from the description of example implementations.

The SN node may include a processor; memory storing an assigned portion of a distributed mempool structured as a distributed hash table, the distributed mempool containing pending transactions awaiting confirmation; a network interface; and a blockchain SN node application containing processor-executable instructions. The instructions, when executed, may cause the processor to receive a transaction, including a transaction identifier; hash the transaction identifier to obtain a (cryptographic) key; determine, using the key, whether the transaction is stored in the distributed mempool or not and, if not, then store the transaction in the distributed mempool as a pending transaction; and send the transaction to a set of nodes other than SN nodes using peer-to-peer connections.

In some implementations, the memory may further store data regarding the number of confirmations of a block containing the transaction and included in the blockchain and wherein the instructions are to cause the processor to remove the transaction from the distributed mempool when the number of confirmations reaches a minimum number. The data regarding the number of confirmations may either be a count of the number of confirmations that is updated with each new block added to the blockchain or is a block number of the block in which the transaction is included, in some examples.

In some implementations, the memory may further store a SN node reputation table that includes an identifier for any detected new neighbouring SN nodes and an associated score for that new neighbouring merchant node based on detected activity of the new neighbouring merchant node. In some examples, the instructions are to cause the processor to update the score of the new neighbouring SN node and to determine that the score of the new neighbouring SN node has fallen below a threshold and, as a result, designate the new neighbouring SN node as a malicious node and isolate the new neighbouring SN node.

In some implementations, the assigned portion of the distributed mempool partially overlaps a second portion of the distributed mempool stored at another of the SN nodes.

In some implementations, each of the SN nodes may store a respective assigned portion of the distributed mempool, and the respective assigned portions may partly overlap such that each of the pending transactions is stored in at least two of the SN nodes, but not all of the SN nodes. Optionally, each of the pending transactions is included in no more than two of the respective assigned portions of the distributed mempool.

Additionally or alternatively, the present application may provide a computer-implemented method to facilitate blockchain transfers (eg transactions) involving a plurality of nodes coupled to a network used to implement a blockchain, wherein a subset of the plurality of nodes are SN nodes, the SN nodes store a distributed mempool containing pending transactions awaiting confirmation, and the distributed mempool is implemented as a distributed hash table among the SN nodes. The method, (which may be implemented at one of the SN nodes), may include receiving a transaction, including a transaction identifier; hashing the transaction identifier to obtain a key; determining, using the key, whether the transaction is stored in the distributed mempool or not and, if not, then storing the transaction in the distributed mempool as a pending transaction; and sending the transaction to a set of nodes other than SN nodes using peer-to-peer connections.

Additionally or alternatively, the present application may provide for a non-transitory processor-readable medium storing processor-executable instructions to participate in a blockchain transaction among a plurality of participating nodes, wherein the processor-executable instructions, when executed by a processor in one of the participating nodes, cause the processor to carry out one or more of the methods described herein.

These and other aspects of the present invention will be apparent from and elucidated with reference to, the embodiment described herein. An embodiment of the present invention will now be described, by way of example only, and with reference to the accompanying drawings, in which.

Figure 6:
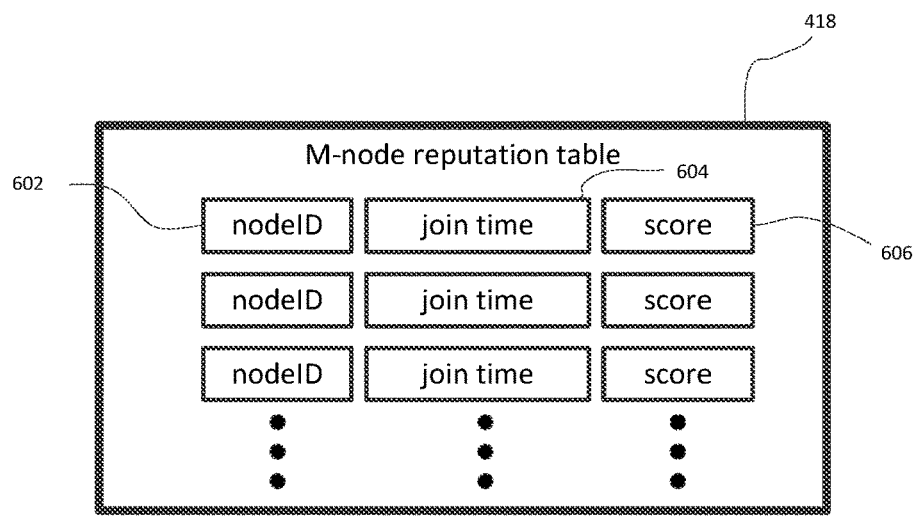

FIG. 6 diagrammatically shows an example of the M-node registration table.

Figure 7:
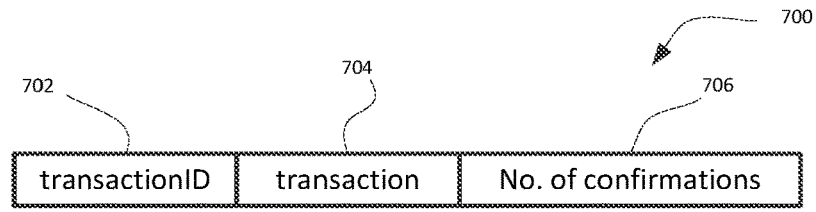

FIG. 7 shows an example mempool data entry.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Figure 1:
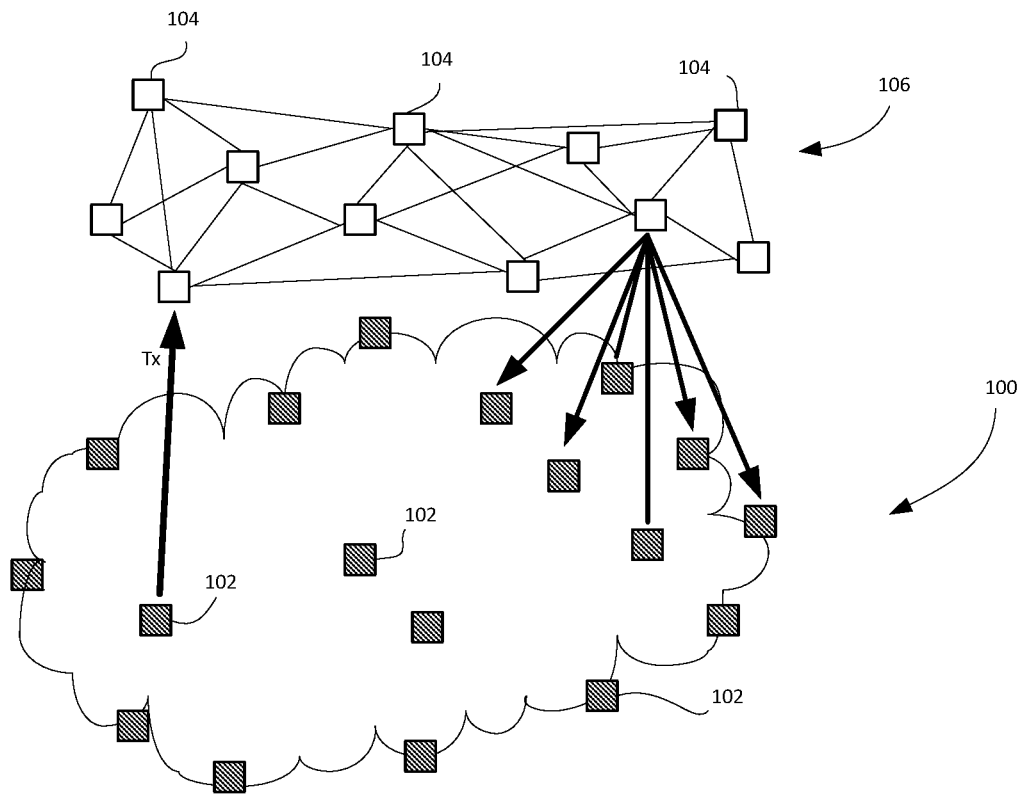
FIG. 1 illustrates an example network of nodes with an overlay network of merchant (SN) nodes.

Reference will first be made to FIG. 1 which illustrates, in block diagram form, an example network associated with a blockchain, which may be referred to herein as a blockchain network 100. The blockchain network 100 is a peer-to-peer open membership network which may be joined by anyone, without invitation or without consent from other members. Distributed electronic devices running an instance of the blockchain protocol under which the blockchain network 100 operates may participate in the blockchain network 100. Such distributed electronic devices may be referred to as nodes 102. The blockchain protocol may be a Bitcoin protocol, or other cryptocurrency, for example.

The electronic devices that run the blockchain protocol and that form the nodes 102 of the blockchain network 100 may be of various types including, for example, computers such as desktop computers, laptop computers, tablet computers, servers, mobile devices such a smartphones, wearable computers such as smart watches or other electronic devices.

Nodes 102 of the blockchain network 100 are coupled to one another using suitable communication technologies which may include wired and wireless communication technologies. In many cases, the blockchain network 100 is implemented at least partly over the Internet, and some of the nodes 102 may be located in geographically dispersed locations.

Nodes 102 maintain a global ledger of all transactions on the blockchain, grouped into blocks each of which contains a hash of the previous block in the chain. The global ledger is a distributed ledger and each node 102 may store a complete copy or a partial copy of the global ledger. Transactions by a node 102 affecting the global ledger are verified by other nodes 102 so that the validity of the global ledger is maintained. The details of implementing and operating a blockchain network, such as one using the Bitcoin protocol, will be appreciated by those ordinarily skilled in the art.

Each transaction typically has one or more inputs and one or more outputs. Scripts embedded into the inputs and outputs specify how and by whom the outputs of the transactions can be accessed. The output of a transaction may be an address to which value is transferred as a result of the transaction. That value is then associated with that output address as an unspent transaction output (UTXO). A subsequent transaction may then reference that address as an input in order to spend or disperse that value.

Nodes 102 may be of different types or categories, depending on their functionality. It has been suggested that there are four basic functions associated with a node 102: wallet, mining, full blockchain maintenance, and network routing. There may be variations of these functions. Nodes 102 may have more than one of the functions. For example, a "full node" offers all four functions. A lightweight node, such as may be implemented in a digital wallet, for example, and may feature only wallet and network routing functions. Rather than storing the full blockchain, the digital wallet may keep track of block headers, which serve as indexes when querying blocks. Nodes 102 communicate with each other using a connection-oriented protocol, such as TCP/IP (Transmission Control Protocol).

The present application proposes and describes an additional type or category of node: a merchant node 104 (herein referred to at times as an "M-node" 104). M-nodes 104 are designed to focus on fast propagation of transactions. They do not store a full blockchain and do not perform mining functions. In that sense, they are similar to lightweight nodes or wallets; however, they include additional functionality to enable fast propagation of transactions. The operational focus of the M-nodes 104 is the quick validation and propagation of unconfirmed transactions, particularly to other M-nodes 104, from which the unconfirmed transactions are quickly pushed out to other nodes 102 in the blockchain network 100. To facilitate this functionality, M-nodes 104 are permitted a greater number of incoming and, particularly, outgoing connections that might otherwise be permitted for nodes 102 under the governing protocol.

The M-nodes 104 may be collectively referred to as the merchant network 106 (or "M-net" 106). The term "merchant" may be interpreted as meaning "specialised". Although shown, for ease of illustration, as a physically distinct network in FIG. 1, the M-nodes 104 may be integrated into the blockchain network 100. Each M-node 104 is a specialized node on the blockchain network 100 that meets certain hardware and performance capabilities that will ensure that it is able to carry out the functions of an M-node 104. That is the M-net 106 might be considered a sub-network within and distributed through the blockchain network 100. The M-Node(s) may be arranged and configured to perform one or more dedicated functions or services.

In order for the M-net 106 to run reliably and be able to offer service at a certain security level the M-nodes 104 need to maintain a good overview of the whole M-net 106 and thus an efficient routing protocol needs to be in place. Every time an M-node 104 receives an initiating transaction it needs to broadcast it to several other M-nodes 104, as well as other nodes 102. In the context of the M-net 106, this amounts to finding a solution to the multiple traveling salesman problem (MTSP). There are a plethora of solutions that address this issue, any one of which may be employed in the M-net 106. The M-nodes 104 each run routing optimization in some, up-to-date form.

In some implementations, the M-net 106 is implemented as a decentralized IP multicast type of network. That is, to enable fast proliferation of an incoming transaction to the blockchain network 100, multicast may be used to ensure that the transaction is broadcast quickly throughout the M-net 106, allowing all the M-nodes 104 to then focus on forwarding the transaction to other nodes 102 in the blockchain network 100.

A multicast network architecture allows the possibility of simultaneous distribution of data towards a group of destination nodes, without data duplication for each of the nodes interested in receiving the information. If a node wants to receive a multicast transmission, it joins the multicast group (registration phase) and after that it will be able to receive all the data sent over the multicast group. IP multicast can scale to a larger receiver population by not requiring prior knowledge of how many receivers there are and the network infrastructure is used efficiently by requiring the source to send a packet only once. For the nature of a multicast network, the use of connection oriented protocols (like TCP) is impractical due to simultaneous communication with a large number other nodes. Accordingly, a connectionless protocol is used.

Some blockchain networks, such as Bitcoin, use TCP for node-to-node communications. Data packets sent using TCP have an associated sequence number which is used for ordering purposes. In addition to this, the TCP protocol involves a three-way handshake procedure, both when establishing a connection as well as terminating one. Packets sent over TCP come with an overhead associated, they have a sequence number associated and there is a three-way handshake protocol. In establishing a connection 128-136 bytes are being transmitted, whereas closing a connection costs 160 bytes. Thus the handshake in packet transmission costs up to 296 bytes. Additionally, when a node receives a new transaction, it notifies the other nodes with an inventory (INV) message which contains the hash of the transaction. A node which receives an INV message checks whether the hash of that transaction has been seen before; if not, the node will request the transaction by sending a GETDATA message. The time necessary to transmit a transaction from Node A to Node B is T1=verification+TCP(inv+getdata+tx), where TCP( ) indicates the overhead, in terms of time, introduced by the TCP handshake procedure.

The M-nodes 104 may be configured to use TCP for communications with other nodes 102 where that is mandated by an existing protocol, like Bitcoin. However, they may use a connectionless protocol, like User Datagram Protocol (UDP), for communications from M-node 104 to M-node 104, or even more suitably from M-node 104 to multiple M-nodes 104 in a multicast situation. Unlike TCP, UDP does not involve a handshake protocol so the M-node 104 is able to propagate transactions more quickly. This can also avoid having a malicious node tie up other nodes by sending repeated INV messages without ever sending an actual transaction.

The lightweight nature of UDP is associated with certain trade-offs. There is less error checking and no error recovery. In some implementations, these limitations of UDP can be overcome at the application level through implementing error recovery, ordering and re-transmission as functionalities of the application layer. Placing error checking at the application level removes the overhead from the network.

In one example situation, a regular node 102 on the blockchain network 100 generates a transaction that it wishes to have processed via the M-net 106, such as a merchant-based payment. It may send the transaction to an M-node 104, which then broadcasts it to other M-nodes 104 using multicast, or it may send the transaction directly to multiple M-node 104 if it knows the IP multicast address for the M-nodes 104. In some examples, all M-nodes 104 of the M-net 106 are members of a single multicast address, so all transactions sent to that address are received by all M-nodes 104; however, in some cases, there may be more than one multicast address associated with the M-net 106, and a receiving M-node 104 may assess, from routing information, whether further broadcast of the transaction to other multicast addresses is required to propagate the transaction to the full M-net 106.

Multicast assists in ensuring fast initial propagation of new transactions to all M-nodes 104; however, the multicast solution does not necessarily address a scalability problem with the blockchain network 100 that comes from an increased transaction throughput. Each node 102 in the network 100 typically maintains a mempool containing the unconfirmed transactions it has seen and that have not yet been incorporated into the blockchain by a miner completing a proof-of-work. A significant growth in the number of transactions coming from use in payment processing would increase the volume of transactions to store in each mempool. Accordingly, although the nodes in the M-net 106 are able to receive a new transaction almost at the same time, they may have storage capabilities limitations with respect to a large and quickly changing mempool.

To address this problem, the present application proposes that the M-nodes 104 use a shared mempool implemented by way of a Distributed Hash Table (DHT) as an alternative to using multicast.

Assuming an average size of a transaction (TX) of 500 bytes and a transaction rate of ~$10^4$ TX/s, the M-net 106 may receive ~400 GB of daily incoming data. All of this data needs to be stored for varying amounts of time in a mempool of unconfirmed transactions. Accordingly, the M-net 106 requires significant storage and the capability to store data fast. In order not to put too many requirements on each individual M-node 104, the M-nodes 104 implement a shared mempool which relies on a DHT. Instead of having each M-node 104 keep all incoming TXs in its own mempool, each M-node 104 only stores a certain fraction of the total, and hashes and associated key values of the rest.

DHTs are a class of decentralized distributed systems which allows the membership partitioning of a key set among nodes and which are able to send messages in an efficient and optimized manner only to the owner of a given key. Each node of a network can be seen as a cell of an array of a hash table. DHTs are designed for managing a high number of nodes, allowing the possibility for new nodes to join the network, old nodes to leave and crash without compromising the integrity of the shared data. DHTs ensure decentralization (there is no central authority, nor central coordination), scalability (the system has an efficient behaviour with millions of nodes), and fault tolerance (the system is reliable and able to manage nodes which join and leave the network or crash). Each node of the network may stay in touch with only a small number of other nodes, hence in the presence of a change or a new piece of data, the network is not overloaded.

The same concept may be applied for the UTXO database, a database which contains the set of all unspent outputs on the blockchain. An UTXO database may be built using a DHT in order to share the content among a set of nodes.

There are a number of possible DHT architectures and protocols that may be used to implement a shared mempool for the M-net 106. Once example is Pastry™, although there are many others. Pastry™ is a protocol designed for maintaining an overlay network able to store and transfer information on a distributed system. Each node in the Pastry™ network is assigned a 128-bit identifier, which is used to indicate a node's position in a circular nodeID space (ranging from 0 to $2^{128}-1$). The ID is assigned randomly when a node joins the network. Each node maintains a routing table, a neighbourhood set and a leaf set.

One factor to consider in dimensioning a robust DHT is the number of replicas needed to ensure robustness and reliability of the whole network. As already mentioned, nodes can join and leave the network, and this fact should not affect the availability of data. If a node which stores a transaction A leaves the network, it is necessary to find the transaction A in another portion of the network. In existing blockchain networks, like Bitcoin for example, the network has a number or blockchain replicas equal to the number of full nodes in the network (an average of 5000 replicas), but this fact affects scalability.

In the presently-proposed M-net 106, the mempool is not fully replicated at every M-node 104 but, instead, is implemented by way of DHT. To provide for reliability, the DHT may be implemented so as to have some overlap; i.e. each transaction data item is replicated in more than one M-node 104, although not in every M-node 104. As an example, the DHT may be implemented so as to specify a minimal number of 2 replicas. This results in a probability of the 2 nodes going down at once in any given hour, assuming complete independence between nodes would be $$\left(\frac{1}{(24*365)}\right)^2 = 1.30*10^{-8}.$$

Figure 2:
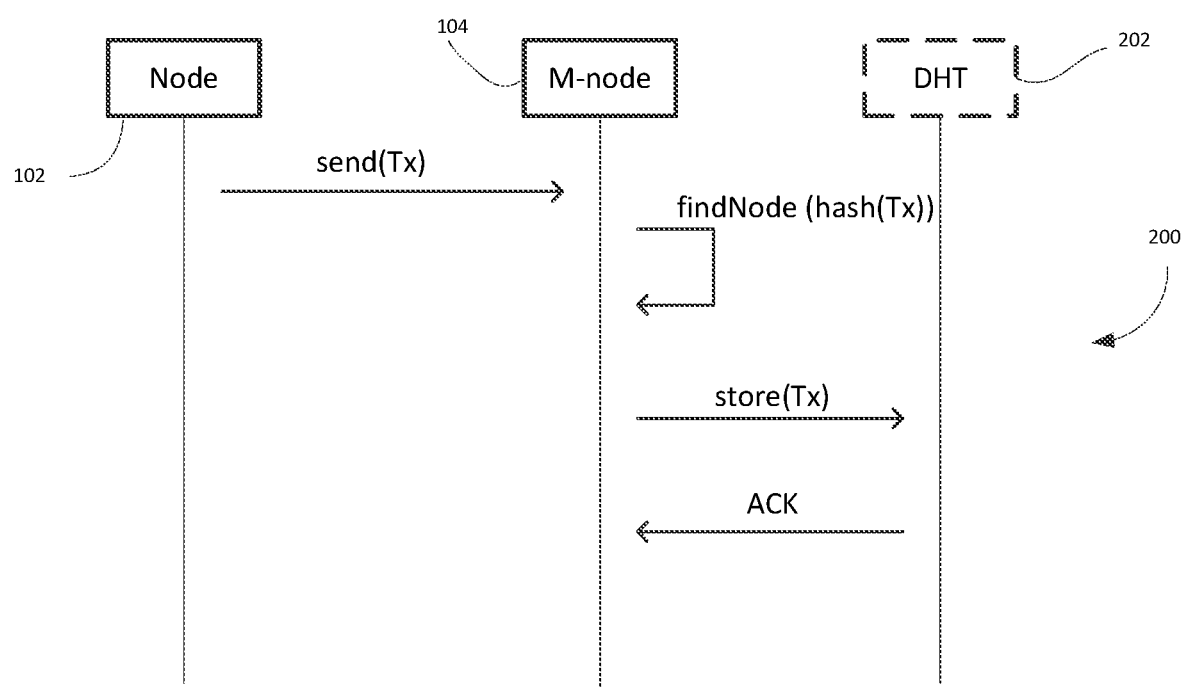
FIG. 2 shows a sequence diagram illustrating a process for storing a new transaction in a distributed mempool.

Reference is now made to FIG. 2, which shows a sequence diagram illustrating a process 200 for storing a new transaction in a distributed mempool 204. The distributed mempool 204 is implemented using a DHT. The process 200 includes the node 102 sending a transaction to the M-node 104. The M-node 104 hashes the transaction or the transaction ID, depending on the implementation, to obtain a key value. The key value indicates the M-node 104 or M-nodes 104 (in the case of replicated data) at which the transaction is to be stored. The M-node 104 then stores the transaction in the distributed mempool 204, which may include routing the transaction to the correct M-node(s) 104 at which it is to be stored based on the key value and the assigned IDs of the M-nodes 104 in the M-net 106. The M-node 104 may receive an acknowledgement, depending on the DHT protocol involved.

Figure 3:
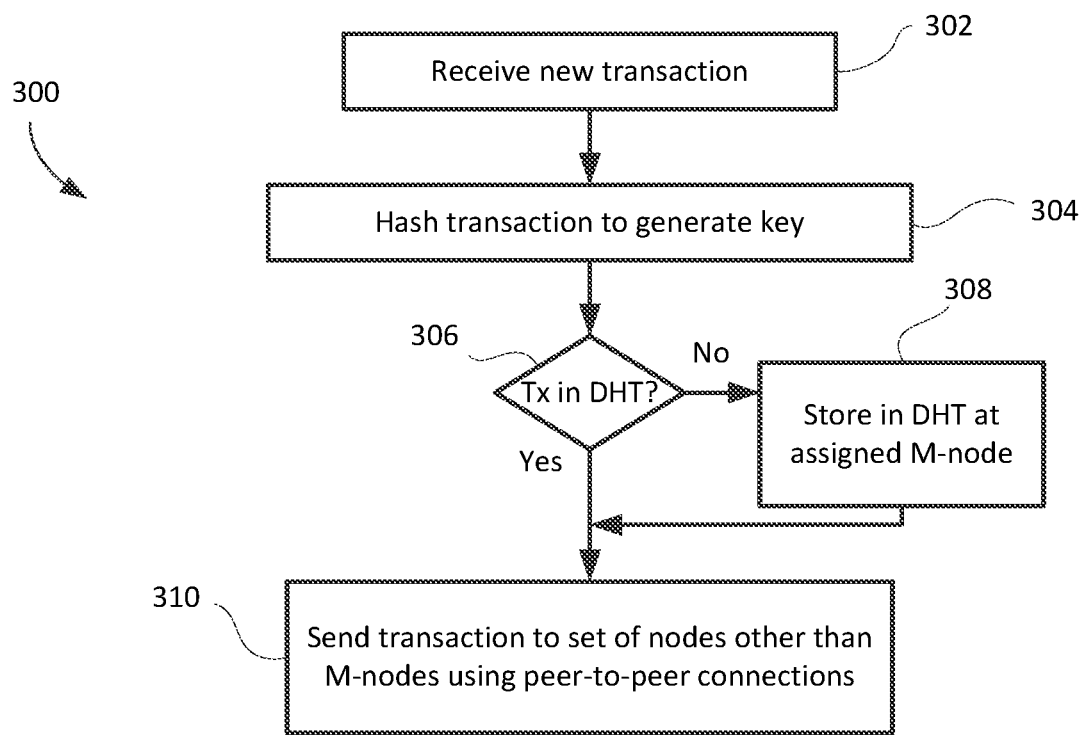
FIG. 3 shows, in flowchart form, one example method of propagating a transaction in a blockchain network.

Reference is now also made to FIG. 3, which shows, in flowchart form, one example method 300 of propagating a transaction in a blockchain network. The method 300 is implemented by an M-node 104 (FIG. 1). The M-node 104 receives a new transaction from a regular node in operation 302. The M-node 104 may perform certain validation operations to verify the authenticity of the transaction.

The transaction may be hashed to generate a key for the transaction, as indicated by operation 304. The key may indicate where in the DHT the transaction should be stored, which may be at a node other than the current M-node 104. The M-node 104 then assesses whether the transaction is already in the DHT in operation 306. Each M-node 104 has a portion of the stored transactions based on a division of the keyspace amongst the M-nodes 104 that make up the M-net 106 (FIG. 1). In some implementations, the keyspace is divided among the participating M-nodes 104. The division may involve overlapping so as to cause replication for resiliency of the network. In some implementations, such as using Pastry™, each M-node 104 is assigned a unique key or ID number and transactions may be stored at the M-node 104 or M-nodes 104 (in the case where replication is desired) based on proximity to the transaction's key value. The M-nodes 104 may have a stored portion of the transactions locally and hashes or key values of the rest. Accordingly, the M-node 104 may be able to evaluate whether the new transaction is in the DHT based on local data in operation 306.

If the transaction is not in the DHT, the M-node 104 then, in operation 308, stores the transaction in the DHT based on its key value. In a general sense this may take the form of a put(k, tx) operation, where k is the key value and tx is the transaction. The applicable DHT routing protocol ensures that the transaction is sent to and stored at the appropriate M-node(s) 104. The DHT may operate in accordance with various protocols for distributed hash tables depending on the implementation selected. The use of DHT for storing a transaction in the M-net 106 avoids the use of INV/GET-DATA messages within the M-net 106 to route the transaction to every M-node 104.

In operation 310 the M-node 104 may, in this example, send the transaction to regular nodes 102 in the blockchain network 100 in accordance with the normal transaction forwarding protocols of the blockchain network 100. For example, the communication to ordinary nodes may employ TCP for node-to-node connections.

Figure 4:
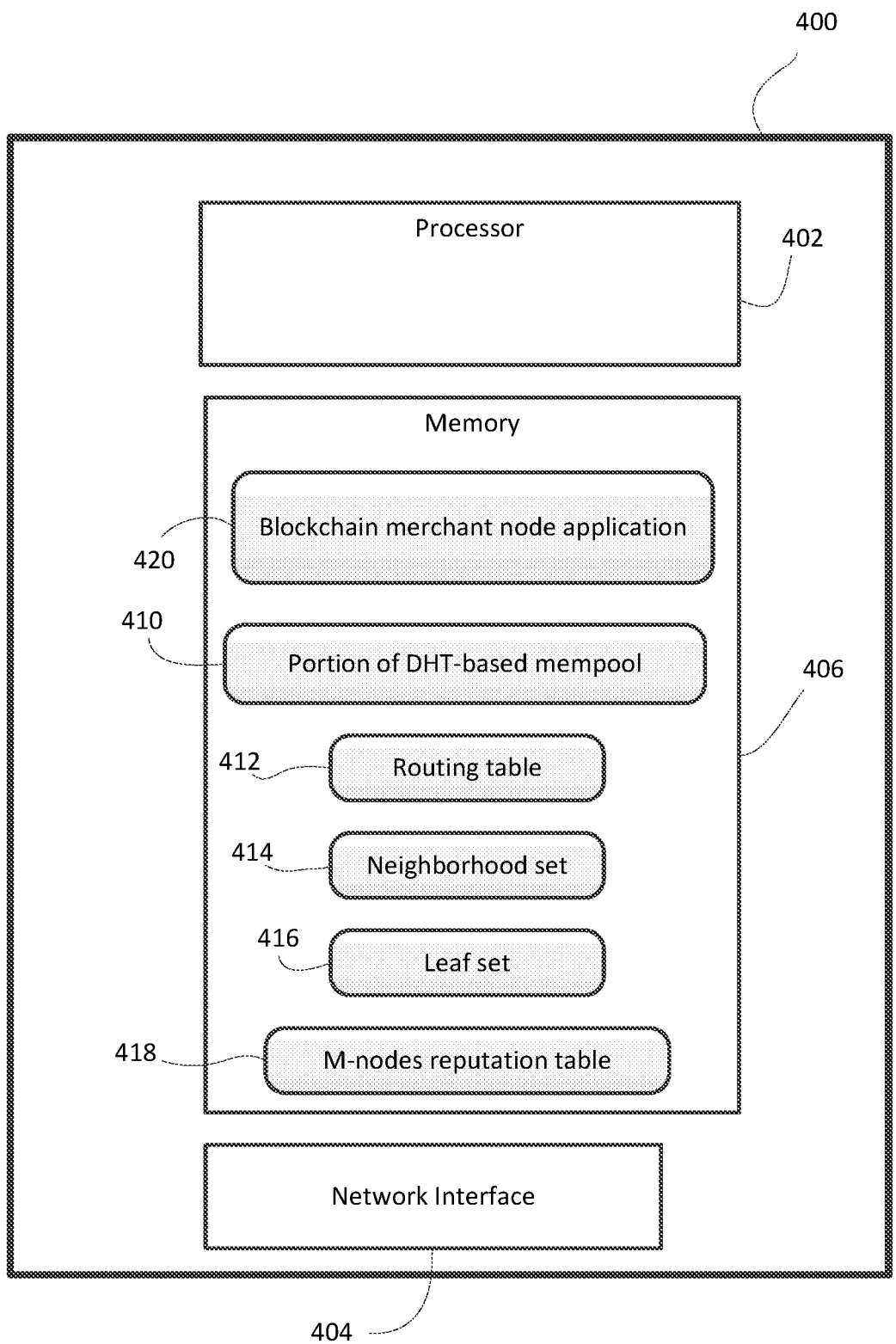
FIG. 4 shows, in block diagram form, a simplified example of an M-node.

Reference will now be made to FIG. 4, which shows, in block diagram form, a simplified example of an M-node 400. The M-node 400 in this example includes a processor 402, a network interface 404 and memory 406. The M-node 400 may be implemented using any suitable computing hardware having network connectivity and sufficient processing and memory resources to carry out the functions described herein. The M-node 400 may include processor-executable instructions to implement the functions described herein. In some cases, the processor-executable instructions may be referred to as a blockchain merchant node application 420, although it will be appreciated that the instructions may be implemented in one or more modules, applications, scripts or other programming structures, depending on the hardware and operating system. The processor 402 may include a multi-core processor, and/or multiple processors.

The memory 406 stores data, including an assigned portion of the DHT-based mempool 410, based, in part, on its DHT key value, i.e. the M-node ID. In this example implementation, the memory 406 further stores a routing table 412, neighbourhood set 414, and leaf set 416. The routing table 412 contains a list of specific routing destinations within the M-net, and when a node receives a packet of data, it references the routing table to know where to send that data. The routing table 412 may also contain information on how far each destination is from the M-node 400. The neighbourhood set 414 contains information about close M-nodes based on, for example, proximity metrics (ping latency). The leaf set 416 contains numerically close M-nodes. M-nodes are numerically close if their key values (node ID) are numerically close. The memory 406 further includes an M-node reputation table 418, as will be further explained below.

Figure 5:
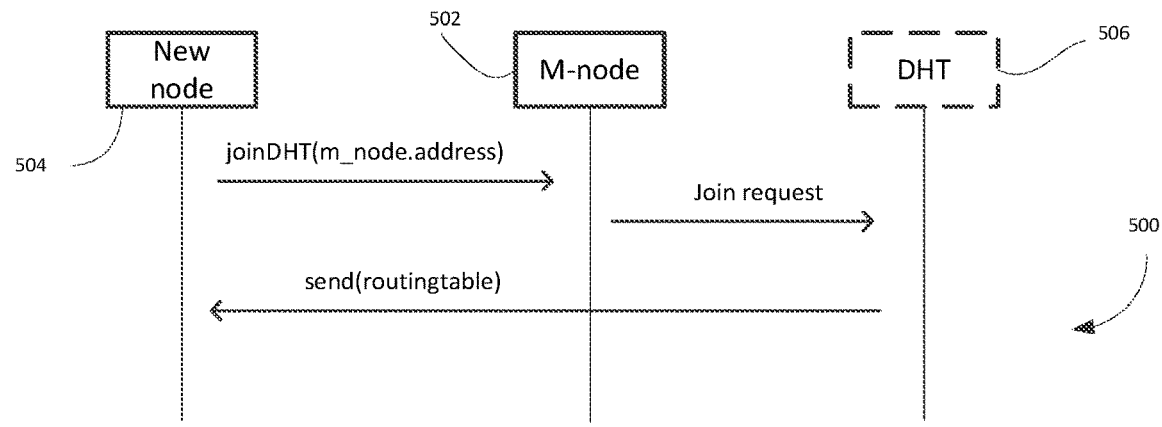
FIG. 5 shows a sequence diagram illustrating an example of a new node joining the M-net.

To provide for scalability, in addition to implementing the mempool using a DHT, the M-net allows for nodes to join the M-net. FIG. 5 shows a sequence diagram 500 illustrating an example of a new node 504 joining the M-net, in which the mempool is implemented as a DHT 506. The new node 504 will need to have the address of at least one M-node already part of the M-net so that it can direct its join request to one of the M-nodes. The signal diagram 500 shows the example of the new node 504 sending a joinDHT(m-node.address) request to an M-node 502. The M-node 502 may perform certain validation actions, which may involve querying the new node 504. For example, the M-net may have a set of minimum criteria associated with joining the M-net that it specifies to the M-nodes 502. As an illustration, the criteria may include minimum processing resources available, or minimum free memory available, or connectivity requirements.

Assuming the M-node 502 completes whatever validation operations are performed to vet the new node 504, it then forward a joinrequest( ) to the DHT 506 in accordance with whatever DHT protocol governs operation of the DHT 506. The DHT 506 then communicates with the new node 504 to provide it with a routing table, key value (node ID), and any other data to enable the new node 504 to function as a new M-node on the M-net.

It will be appreciated that the ease with which a node is able to join the M-net creates a vulnerability in that a malicious node may join the network. In order to identify and isolate a potential malicious node, the present application provides for the M-nodes to store the M-node reputation table 418. FIG. 6 diagrammatically shows an example of the M-node reputation table 418 to be used for tracking and updating node behaviour ranking.

When a new node joins the network, the node may be added to the M-node reputation table 418, as indicated by a node ID field 602. The table 418 may further include a join time 604 in some implementations. The table 418 further includes a score 606 or rating for that M-node.

The score 606 may be adjusted up or down based on certain behaviour metrics. For example, if the M-node fails to forward transactions, remains silent for a period of time, floods the M-net with traffic determined to be non-transactional, or otherwise engages in negative behaviour, its ranking may be dropped or decremented. If a node's score falls below a preset minimum, then it may be excluded from the M-net.

The M-node reputation table 418 maintained at a particular M-node may be limited to tracking scores of its neighbours, rather than the full M-net. Accordingly, when a new M-node joins the network at the time t, the M-node reputation tables of its neighbours do not contain any information about the new node, but from the moment t they start building a reputation of the new node storing the information in the nodes register table. For example, if the new node is a silent node, meaning that it does not transfer the information it receives over the network, all the neighbours start recording this behaviour in their respective M-node reputation tables, for example assigning a negative value to the ID of new node. After a certain time t+n, if the M-node reputation tables of all the nodes which are aware of the new node, contain a negative value, the nodes may decide to isolate the new node and ban it from the network.

Reference is now made to FIG. 7, which shows an example mempool data entry 700. Transactions in the distributed mempool of the M-net may wait for a significant period of time before being confirmed, i.e. before being incorporated into a block that is added to the blockchain and confirmed. A block is considered "confirmed" when a sufficient number of subsequent blocks have been added to the blockchain above it such that it would be computationally impractical to reverse the growth in the chain and remove the block in order to change to a different branch or fork.

Because of the size and flexibility of the mempool and the volume of transactions, it is possible that a given transaction may be unconfirmed for longer than in some blockchain implementations, like Bitcoin. In a conventional Bitcoin implementation, a transaction is removed from the mempool as soon as it is incorporated into a block. This means that if the block ends up being an orphan block that all the transactions in the block are retransmitted on the network. This may be impractical or may result in long delays for confirming certain transactions in the case of a fast transaction network.

Accordingly, in some implementations, the mempool may track the number of confirmations of the block into which the transaction has been incorporated, i.e. the number of blocks added to the blockchain subsequent to the block in which the transaction is incorporated. Only after a predetermined number of confirmations have occurred is the transaction removed from the mempool. The predetermined number may be 4, 5, 6, 7 or any suitable number for a given implementation. As shown in FIG. 7, the mempool data entry 700 may be structured to include a transaction ID field 702, a transaction field 704, and a number of confirmations (NoC) field 706. In another implementation, rather than tracking the NoC, the mempool data entry 700 may simply record the block number. From the block number it can assess, based on the current block number of the blockchain, how many confirmations have occurred.

Once the requisite number of confirmations has occurred, the transaction may be safely removed from the mempool. In this way there is no transactions-loss in case of orphan blocks, and a transaction will be permanently removed after the requisite number of confirmations.

One or more embodiments of the invention may be described as providing an improved blockchain-implemented method and system. It may provide improved speed of operations, such as write operations, exchanges or transfers, via the blockchain network. Other advantages of the invention may also be provided.

It will be understood that the devices and processes described herein and any module, routine, process, thread, application, or other software component implementing the described method/process for configuring the video feature extractor may be realized using standard computer programming techniques and languages. The present application is not limited to particular processors, computer languages, computer programming conventions, data structures, or other such implementation details.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A specialized network node arranged to facilitate distribution of blockchain transactions over a network of interconnected nodes used to implement a blockchain, a subset of which are specialized network nodes interconnected by an overlay network, the specialized network node comprising:
a processor;
memory storing an assigned portion of a distributed mempool structured as a distributed hash table, the distributed mempool containing pending transactions awaiting confirmation;
a network interface; and
a blockchain specialized network node application containing processor-executable instructions which, when executed by the processor, cause the processor to:
receive a transaction, including a transaction identifier;
hash the transaction identifier to obtain a key;
determine, using the key, whether the transaction is stored in the distributed mempool or not and, if not, then store the transaction in the distributed mempool as a pending transaction; and
send the transaction to a set of nodes other than specialized network nodes using peer-to-peer connections.

2. The specialized network node claimed in claim 1, wherein the memory further stores data regarding a number of confirmations of a block containing the transaction and included in the blockchain and wherein the instructions are to cause the processor to remove the transaction from the distributed mempool when the number of confirmations reaches a minimum number.

3. The specialized network node claimed in claim 2, wherein the data regarding the number of confirmations is either a count of the number of confirmations that is updated with each new block added to the blockchain or is a block number of the block in which the transaction is included.

4. The specialized network node claimed in claim 1, wherein the memory further stores a specialized network node reputation table that includes an identifier for any detected new neighbouring merchant nodes and an associated score for that new neighbouring specialized network node based on detected activity of the new neighbouring specialized network node.

5. The specialized network node claimed in claim 4, wherein the instructions are arranged to cause the processor to update the score of the new neighbouring specialized network node and to determine that the score of the new neighbouring specialized network node has fallen below a threshold and, as a result, designate the new neighbouring specialized network node as a malicious node and isolate the new neighbouring specialized network node.

6. The specialized network node claimed in claim 1, wherein said assigned portion of the distributed mempool partially overlaps a second portion of the distributed mempool stored at another of the specialized network nodes.

7. The specialized network node claimed in claim 1, wherein each of the specialized network nodes stores a respective assigned portion of the distributed mempool, and wherein the respective assigned portions partly overlap such that each of the pending transactions is stored in at least two of the specialized network nodes, but not all of the specialized network nodes, and optionally, wherein each of the pending transactions is included in no more than two of the respective assigned portions of the distributed mempool.

8. A computer-implemented method to facilitate blockchain transfers involving a plurality of nodes coupled to a network used to implement a blockchain, wherein a subset of the plurality of nodes are specialized network nodes, the specialized network nodes storing a distributed mempool containing pending transactions awaiting confirmation, the distributed mempool being implemented as a distributed hash table among the specialized network nodes, wherein the method comprises:
   receiving a transaction, including a transaction identifier;
   hashing the transaction identifier to obtain a key;
   determining, using the key, whether the transaction is stored in the distributed mempool or not and, if not, then storing the transaction in the distributed mempool as a pending transaction; and
   sending the transaction to a set of nodes other than specialized network nodes using peer-to-peer connections.

9. The method claimed in claim 8, further comprising determining a number of confirmations of a block containing the transaction and included in the blockchain and, when the number of confirmations reaches a minimum number, removing the transaction from the distributed mempool.

10. The method claimed in claim 9, wherein storing the transaction in the distributed mempool includes storing the transaction in association with the number of confirmations of the block in which it is included, and wherein the number of confirmations stored in the distributed mempool for that transaction is updated with each new block added to the blockchain.

11. The method claimed in claim 9, wherein storing the transaction in the distributed mempool includes storing the transaction in association with a block number of the block in which the transaction is included, and wherein determining the number of confirmations comprises determining a current block number for the blockchain and comparing the current block number to the block number of the block in which the transaction is included.

12. The method claimed in claim 8, further comprising detecting a new neighbouring specialized network node, storing an identifier for the new neighbouring specialized network node in a specialized network node reputation table, and updating a score of the new neighbouring merchant node in the specialized network node reputation table based on detected activity of the new neighbouring specialized network node.

13. The method claimed in claim 12, further comprising determining that the score of the new neighbouring specialized network node has fallen below a threshold and, as a result, designating the new neighbouring specialized network node as a malicious node and isolating the new neighbouring specialized network node.

14. The method claimed in claim 8, wherein said one of the specialized network nodes stores a portion of the distributed mempool, and wherein the portion of the distributed mempool stored at said one of the specialized network nodes partially overlaps a second portion of the distributed mempool stored at another of the specialized network nodes.

15. The method claimed in claim 8, wherein each of the specialized network nodes stores a respective portion of the distributed mempool, and wherein the respective portions partly overlap such that each of the pending transactions is stored in at least two of the specialized network nodes, but not all of the specialized network nodes, and optionally, wherein each of the pending transactions is included in no more than two of the respective portions of the distributed mempool.

16. A non-transitory processor-readable medium storing processor-executable instructions to participate in a blockchain transaction among a plurality of participating nodes coupled to a network used to implement a blockchain, wherein a subset of the plurality of nodes are specialized network nodes, the specialized network nodes storing a distributed mempool containing pending transactions awaiting confirmation, the distributed mempool being implemented as a distributed hash table among the specialized network nodes, wherein the processor-executable instructions, when executed by a processor in one of the plurality of participating nodes, cause the processor to:
   receive a transaction, including a transaction identifier;
   hash the transaction identifier to obtain a key;
   determine, using the key, whether the transaction is stored in the distributed mempool or not and, if not, then storing the transaction in the distributed mempool as a pending transaction; and
   sending the transaction to a set of nodes other than specialized network nodes using peer-to-peer connections.

* * * * *